2,163,954

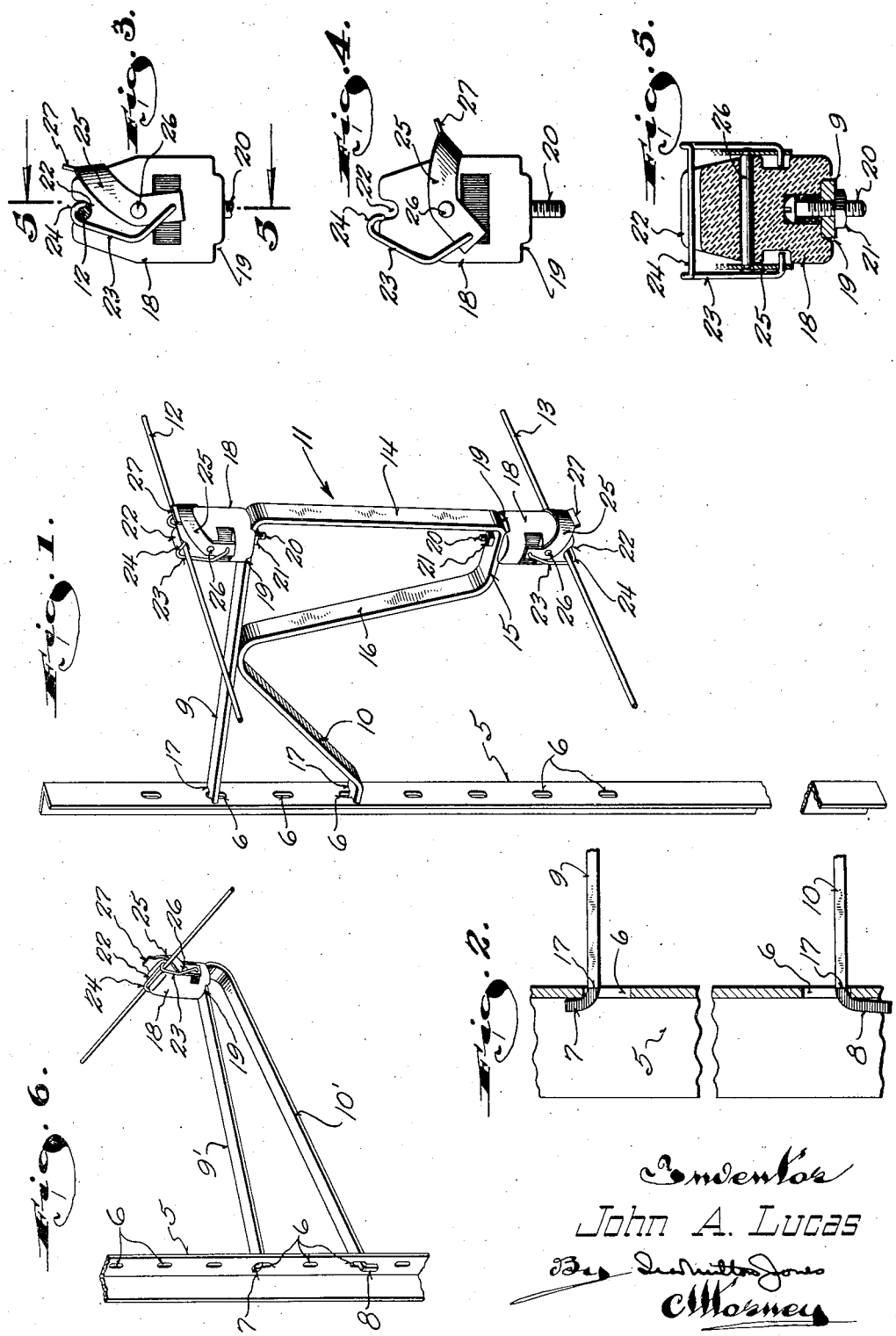
June 27, 1939. J. A. LUCAS 2,163,954
ELECTRIC FENCE
Filed June 7, 1937
Inventor
John A. Lucas Patented June 27, 1939

UNITED STATES PATENT OFFICE 2,163,954

ELECTRIC FENCE

John A. Lucas, Milwaukee, Wis., assignor to Prime Manufacturing Company, Milwaukee, Wis., a corporation of Wisconsin Application June 7, 1937, Serial No. 146,780

2 Claims. (Cl. 256—10)

This invention relates to improvements in electric fences used for livestock barriers and enclosures.

Fences of this nature are generally always installed by the farmer himself, and heretofore, it has been necessary for him to provide his own mounting for the fence wires. This he usually did by merely attaching some type of insulator to a wooden fence post and tying the wire to the insulator; and as the efficiency of a fence of this character depends to a great extent upon proper insulation in the mounting of the wires, this practice with its many uncertainties proved a serious drawback to the success of the electric fence.

Another disadvantage of the old practice of mounting the wires on insulators attached directly to the fence post was that hay, grass and weeds growing along the fence line were difficult to cut because of the posts, and as a consequence, were left standing, often touching the wire to thus further decrease the efficiency of the system.

With these objections to past schemes of mounting the wires of an electric fence in mind, this invention has as a general object to provide an improved mounting or support for the wires of an electric fence which is so constructed as to insure positive and adequate insulation and thus avoid the loss in efficiency which heretofore has been incurred.

Another object of this invention is to provide an electric fence of the character described wherein the wires are held at a substantial distance away from the posts so as to permit the cutting bar of a mower to pass under the wire to cut down hay, grass and weeds which might contact the wire and cause objectionable leakage, without restriction by the posts.

Another object of this invention is to provide an improved and simplified manner of attaching the wires of an electric fence to their supports which entirely obviates the need for tying the wire in place, and which is so constructed that the attachment of the wire may be quickly and easily effected by merely actuating a small clamping member.

Another object of this invention is to provide a bracket for supporting the wires of electric fences which may be quickly and easily attached to any of the conventional metal fence posts now on the market.

It is also an object of this invention to provide a simple and convenient means for securing the wire in place, which means is so constructed that the wire is firmly held against longitudinal as well as lateral motion.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates two complete examples of the physical embodiment of the invention constructed in accordance with the best modes so far devised for the practical application of the principles thereof, and in which:

Figure 1 is a perspective view illustrating one embodiment of this invention;

Figure 2 is an enlarged longitudinal sectional view to show the manner in which the bracket is attached to the post;

Figure 3 is a side view of the insulator, illustrating a fence wire clamped in place;

Figure 4 is a view similar to Figure 3, but showing the clamping means open and the fence wire removed;

Figure 5 is a longitudinal sectional view taken on the plane of the line 5—5 of Figure 3; and Figure 6 is a perspective view of a slightly modified embodiment of the invention.

Referring now particularly to the accompanying drawing in which like numerals indicate like parts throughout the several views, the numeral 5 designates an upright steel fence post which is adapted to be set into the ground. In this instance, the post is in the form of an angle iron, but any other structural shape will suffice.

At equispaced locations along the length of the post, one flange thereof has a plurality of oblong holes 6. Into these holes are inserted hooks 7 and 8 on the extremities of two spring arms 9 and 10 of a bracket, indicated generally by the numeral 11. The bracket 11 may be of the type illustrated in Figure 1 to provide a mounting for two superimposed fence wires 12 and 13, or it may be of the single wire type, as illustrated in Figure 6. In each instance, the bracket is formed from a length of flat band or bar stock bent to the desired shape.

The bracket illustrated in Figure 1 comprises the upper horizontal arm 9, a downwardly directed front portion 14, a short bottom portion 15, which is preferably parallel to the arm 9, an inclined upwardly directed part 16 which meets and is welded or otherwise secured to the arm 9, and the downwardly angularly directed arm 10.

The arms 9 and 10 of the bracket diverge, as shown, and their normal free positions are such that the distance between their outer extremities normally is greater than the space between two alternate holes so that the engagement of their hooks 7 and 8 in these holes requires springing the arms together. Hence, when the hooks are engaged in two alternate holes, the normal spring tension of the arms holds the bracket assembled with the post.

It is to be observed that the tongues 7 and 8 are formed by reducing the width of the arms 9 and 10 at their extremities which results in abrupt shoulders 17 at opposite sides of the tongues. These shoulders engage the flat front face of the post at opposite sides of the holes and because of the inclination of the tongues 7 and 8 acting in conjunction with the spring tension of the arms, the shoulders are drawn firmly against the front face of the post to hold the bracket against lateral motion with respect to the post.

In the single wire type of fence, the bracket may consist merely of the two spring arms 9' and 10', as shown in Figure 6.

The outer extremity of the bracket mounts insulators 18. These insulators are of identical construction and have their bases formed with channels 19 to receive the width of the arms 9 and the lower flat portion 15 so as to prevent rotation of the insulators when mounted on the bracket. Each insulator has a screw 20 embedded therein by which it is clamped to the bracket, a nut 21 being threaded on the screw and bearing against the bracket to draw the insulator firmly against it.

The outer ends of the insulators have transverse open grooves 22 arranged at right angles to their channels 19 so as to lie parallel with the fence line. These grooves are adapted to receive the fence wires, and to hold the wires in place therein, hook members 23 are provided. The hook member 23 of each insulator is preferably formed from a length of stiff wire bent to U-shape and having its closed end portion curved to provide a hook 24 and its arms disposed on opposite sides of the insulator. The extremities of the arms of the hook member are pivotally connected to the legs of a U-shaped clamping member 25 which embraces the insulator and is pivotally attached thereto by a pin 26 passing through the insulator and the arms of the clamping member.

The closed end of the U-shaped clamping member has a lip 27 formed thereon to provide a grip or handle by which the clamping member may be moved from an operative clamping position, illustrated in Figure 3, to an open position, shown in Figure 4.

The disposition of the centers of the pivotal support 26 and the attachment of the hook member to the clamping member with respect to the bottom of the groove 22 is such that the point of attachment of the hook member with the clamping member swings past dead center when the parts are moved to their operative wire securing positions to thus readily detachably, but firmly hold the hook in active position.

From the foregoing description taken in connection with the accompanying drawing, it will be readily apparent to those skilled in the art, that this invention provides a substantial improvement in electric fences and that it particularly insures higher efficiency by providing a proper insulated support for the wires and also makes the installation of the fence a simple matter requiring no particular skill.

It is also evident that with this invention, the location of the electric fence may be quickly and easily changed and its height altered at will without even slackening the wire.

What I claim as my invention is:

1. In an electric fence to provide an effective barrier against livestock, the combination of: an upright post to be set in the ground and having a plurality of equispaced holes arranged longitudinally thereof; a bracket having divergent spring arms provided with hooks at their extremities engageable in two selected holes of the post, the normal distance between the extremities of said arms with respect to the spacing of the holes being such that the arms are placed under tension upon engagement of their hooks with the two selected holes so that the normal resiliency of the spring arms retains the bracket assembled with the post; the outer portion of the bracket having vertically spaced portions; insulators mounted on said vertically spaced portions, each of said insulators having an open groove substantially at right angles to the plane of the bracket; and clamping means carried by the insulators for holding fence wires in their grooves.

2. A bracket for supporting two superimposed wires of an electric fence from a fence post in spaced relation thereto and electrically insulated therefrom comprising: a member bent from a single length of band stock and having an upper horizontal arm, an outer portion depending downwardly from the outer end of said horizontal arm, a lower horizontal portion, an upwardly directed portion extending from said lower horizontal portion to the upper horizontal arm and joined thereto and a downwardly diverging arm; tongues on the extremities of said upper horizontal arm and the downwardly diverging lower arm for engagement in spaced holes in a fence post; and an insulator mounted on the upper horizontal arm and on the lower horizontal portion and adapted to have fence wires attached thereto.

JOHN A. LUCAS.